United States Patent

Nagatsuka et al.

[11] Patent Number: 5,858,152
[45] Date of Patent: Jan. 12, 1999

[54] METHOD FOR PRODUCTION OF COMPOSITE MATERIAL AND COMPOSITE MATERIAL PRODUCED THEREBY

[75] Inventors: Yoshihiro Nagatsuka, Tsukuba; Takeshi Kitano, Ushiku, both of Japan

[73] Assignees: Agency of Industrial Science & Technology; Ministry of International Trade & Industry, both of Tokyo, Japan

[21] Appl. No.: 552,117

[22] Filed: Nov. 2, 1995

[30] Foreign Application Priority Data

Nov. 4, 1994 [JP] Japan ..................................... 6-271106

[51] Int. Cl.$^6$ ...................................................... B32B 31/00
[52] U.S. Cl. .......................... 156/181; 156/166; 156/180; 156/209; 156/282; 156/244.24; 264/103; 264/239; 264/280; 264/284
[58] Field of Search ..................................... 156/166, 180, 156/181, 209, 282, 244.24; 264/103, 239, 280, 284

[56] References Cited

FOREIGN PATENT DOCUMENTS

| 51-33168 | 9/1976 | Japan . |
| 4-303626 | 10/1992 | Japan . |
| 6-71768 | 9/1994 | Japan . |
| 7-63717 | 3/1995 | Japan . |

*Primary Examiner*—Richard Weisberger
*Attorney, Agent, or Firm*—Oblon, Spivak, McClelland, Maier & Neustadt, P.C.

[57] ABSTRACT

A method for the production of a completely impregnated composite material having the surface thereof coated with a thermosetting resin and essentially consisting of a thermoplastic resin matrix including minute voids filled with a thermosetting resin and reinforcing fibers, which method comprises setting in place a roller and a collecting section disposed in the direction of the rotation of the roller, rotating the roller, feeding thermoplastic resin fibers and reinforcing fibers to the roller, causing the roller to throw a uniform mixture of the two types of fibers onto the collecting section, thereby forming a composite mat of the uniform mixture on the collecting section, then thermally compressing the composite mat and further solidifying the compressed composite mat by cooling and forming a composite material of the shape of a plate, further heating the composite material, thereby melting and expanding the thermoplastic resin forming the matrix, then cooling the expanded composite material, thereby forming a foam composite material including minute voids, and subsequently causing a thermosetting resin to form a coating on the surface of the foam composite material and fill the minute voids in the composite material, a method for the production of a coated composite material by the removal of the thermosetting resin filling the minute voids in the composite material obtained by the method described above, and a coated type or completely impregnated composite material produced by the method described above, consisting of a matrix formed of thermoplastic resin and reinforcing fibers, having a thermosetting resin attached to the surface thereof, the matrix including minute voids, and the voids being filled or not filled with a thermosetting resin.

9 Claims, 3 Drawing Sheets

METHOD FOR PRODUCTION OF COMPOSITE MATERIAL AND COMPOSITE MATERIAL PRODUCED THEREBY

BACKGROUND OF THE INVENTION

1. Field of the Invention

This invention relates to a method for the production of a composite material exhibiting excellent qualities such as high strength, light weight, insulating property, and good toughness and to a composite material produced by this method.

2. Description of the Prior Art

Various methods have been heretofore proposed and adopted for the production of composite materials having reinforcing fibers bound with a matric material such as, for example, a thermoplastic synthetic resin. The present inventors also earlier proposed a method disclosed in JP-B-51 (1976)-33148 and JP-A-4(1992)-303626 which comprises mixing reinforcing fibers with a powdery or granular thermoplastic resin and thermally forming the resultant mixture. Since such conventional methods invariably adopt a procedure which comprises mixing a powdery or granular thermoplastic resin as a matrix material with reinforcing fibers and thermally forming the resultant mixture in a desired shape, they encounter difficulty in obtaining a product having the reinforcing fibers uniformly dispersed in the matric material. This is because the two components are not easily to mix uniformly and, after mixing, the powdery or granular resin tends to separate from the mixture. To ensure completely uniform mixture of the reinforcing fibers and the matric resin, it is necessary that the freshly produced mixture be immediately subjected to thermal formation. The product of this thermal formation is therefore limited to the simple shape of flat sheet. As disclosed in JP-B-6(1994)-71768 and U.S. application Ser. Nos. 08/035,204 and 08/335,971, the present inventors developed a fiber separating and throwing apparatus which is capable of forming a composite mat having the component fibers of matric resin fiber bundles and reinforcing fiber bundles uniformly mixed with good separation and distribution and succeeded in using the apparatus to produce a fiber-reinforced composite material which exhibits perfect shape-retaining property and high resistance to separation of the reinforcing fibers and the matrix resin, and allows easy handling of the mixture mentioned above.

Since fiber-reinforced composite material taught by JP-B-6(1994)-71768 uses a thermoplastic resin alone as a matric material, however, it is unsufficient in resistance to heat and consequently not suitable for practical applications.

SUMMARY OF THE INVENTION

The present invention was accomplished in light of these shortcomings of the prior art. Specifically, it pertains to a method for the production of a composite material, characterized by the steps of causing reinforcing fibers and thermoplastic resin fibers to be separated and thrown by a roller having a card clothing wound on the periphery thereof (fiber separating and throwing roller) and kept in rotation at a high rate, collecting the two types of thrown fibers in the form of a uniformly mixed composite mat in a fiber collecting section such as, for example, a collecting belt, thermally forming the composite mat, thereby preparing a fiber-reinforced material in the shape of a flat plate, heating the fiber-reinforced material, thereby melting the thermoplastic resin and giving rise to an expanded foam material, causing a thermosetting resin to permeate the foam material and fill the minute voids in the foam material, and thereafter optionally removing excess resin, if any, by means of aspiration, and to a composite material which is obtained by this method of production.

To be more specific, one aspect of this invention concerns a method for the production of a completely impregnated composite material having the surface thereof coated with a thermosetting resin and essentially consisting of a thermoplastic resin matrix including minute voids filled with a thermosetting resin and reinforcing fibers, which method comprises setting in place a roller and a collecting section (for example, a belt) disposed in the direction of the rotation of the roller, rotating the roller, feeding thermoplastic resin fibers for the matrix of the composite material and reinforcing fibers for the composite material to the rotating roller, causing the roller to throw a uniform mixture of the two types of fibers onto the collecting section, thereby forming a composite mat of the uniform mixture on the collecting section, then thermally compressing the composite mat and further solidifying the compressed composite mat by cooling and forming a composite material consisting of a plate-shaped thermoplastic resin matrix and reinforcing fibers, further heating the composite material, thereby melting and expanding the thermoplastic resin forming the matrix, then cooling the expanded composite material, thereby forming a foam composite material including minute voids, and subsequently causing a thermosetting resin to form a coating on the surface of the foam composite material and fill the minute voids in the composite material.

Another aspect of the invention concerns a method for the production of a coated composite material by the removal of the thermosetting resin filling the minute voids in the composite material obtained by the method described above.

Another aspect of the invention concerns a coated composite material consisting of a matrix of thermoplastic resin and reinforcing fibers, the matrix including minute voids, and having the inner faces of the voids and the outer surface of the composite material covered with a thermosetting resin.

Another aspect of the invention concerns a completely impregnated composite material having a thermosetting resin deposited on the surface thereof and a thermosetting resin filling the minute voids thereof.

The above and other features of the invention will become apparent from the following description made with reference to the accompanying drawings.

DESCRIPTION OF THE PREFERRED EMBODIMENTS

Figure 1:
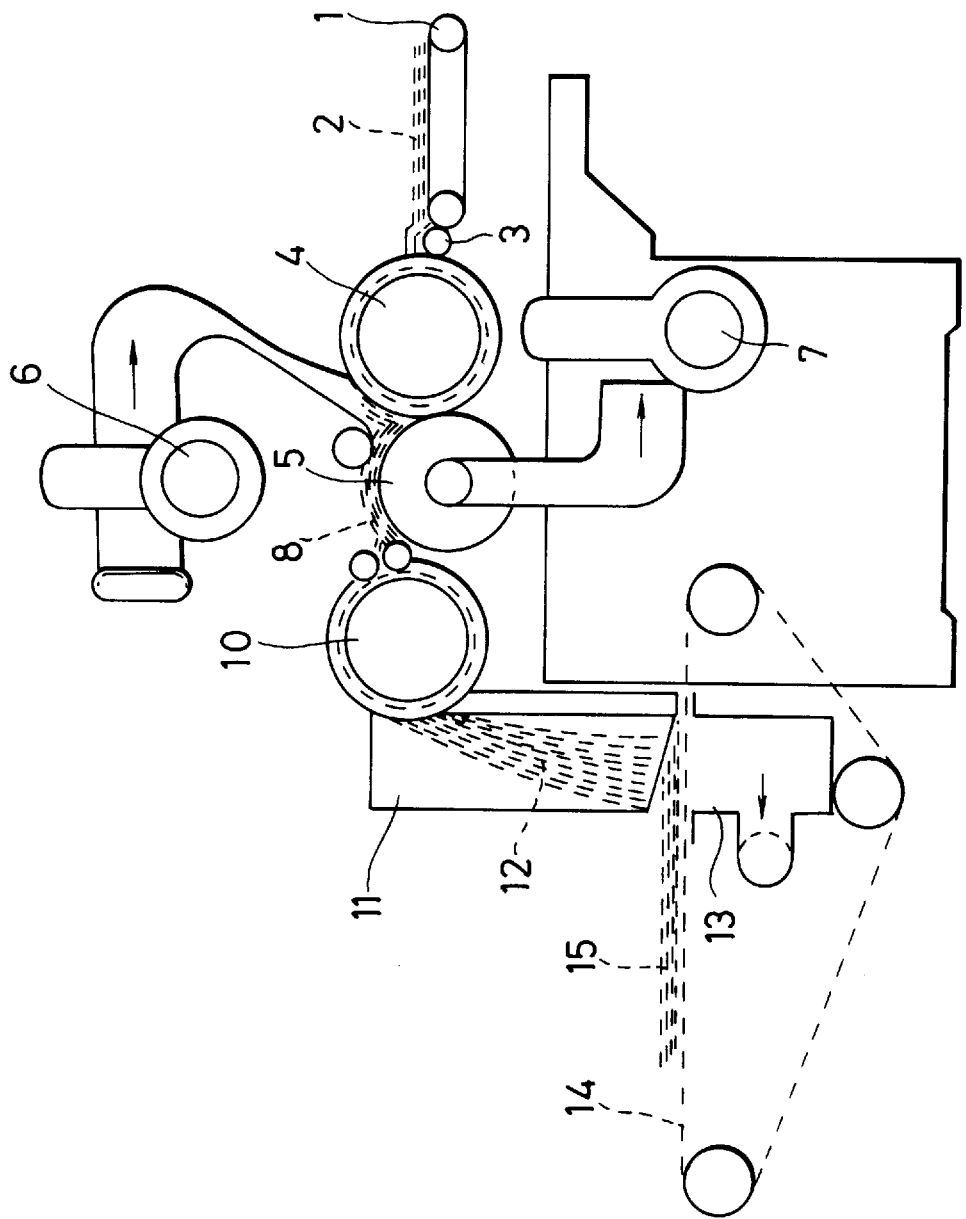
FIG. 1 is a schematic side-view diagram showing the construction of an apparatus for working the method of this invention.

Various fibers such as glass fibers, carbon fibers and aramid fibers can be used as reinforcing fibers in the present invention. Such reinforcing fibers as glass fibers and carbon fibers which can be cut with a roller (a fiber separating and throwing roller which will be hereinafter referred to as "roller") can be supplied to the roller in the form of continuous fibers, and such reinforcing fibers as aramid fibers which cannot be cut with the roller must be supplied to the roller in the form of fibers cut in advance to a proper length.

Various kinds of thermoplastic resin such as polyamide, polypropylene, polyethylene and polyethylene terephthalate can be used for the thermoplastic resin fibers in the composite material of this invention. The thermoplastic resin fibers used must be of a type that does not cause a problem in coexistence with the reinforcing fibers. Those which can be cut with the roller are fed in the form of continuous fibers and those of the kind which are not easily cut therewith are fed in the form of fibers cut in advance to proper length.

The apparatus used for working this invention is constructed as disclosed in JP-B-6(1994)-71768. The fibers are fed so as to be separated and thrown by two rollers which are kept in rotation at a high rate. To be more specific, in a fiber collecting section which is formed of a collecting belt, for example, the two kinds of fibers separated and thrown as described above are collected in the form of a composite mat consisting of a uniform mixture of the fibers. The composite mat is thermally formed to produce a fiber-reinforced material in the shape of a flat plate. The composite mat consists of the reinforcing fibers dispersed in a thermoplastic resin matrix.

This invention is further characterized by the fact that the composite material thereof uses a thermosetting resin therein. Although an epoxy resin is preferably used for the thermoplastic resin, unsaturated polyester resins, phenol resins, etc. are acceptable from the practical point of view. The viscosity of the solution of the thermosetting resin can be suitably adjusted by adjusting the amount of a solvent added thereto.

The reinforcing fibers in the composite mat produced by the method described above are oriented three-dimensionally. A fiber-reinforced material which contains reinforcing fibers in a compressed state therein can be obtained by superposing an appropriate number of such composite mats and forming the resultant stack in a prescribed shape under simultaneous application of heat and pressure. The conditions selected for the thermal compression vary with the kinds of raw material fibers. Practically, it is appropriate to select the temperature in the range of 180° to 300° C. and the pressure in the range of 50 to 100 kg/cm².

Next, the fiber-reinforced material mentioned above is again heated to melt the thermoplastic resin contained therein. As a result, the compressed reinforced fibers spring back and expand the fiber-reinforced material or the composite material. By cooling the resultant expanded material, a foam composite material (foam material) of a porous structure containing minute voids can be produced.

Next, the foam composite material is impregnated with a thermosetting resin so that the thermosetting resin is deposited in the voids and on the outer surface of the foam composite material. Specifically, this impregnation is effected simply by immersing the foam composite material in the solution of the thermosetting resin. Subsequently, by drying the product of this impregnation, a composite material having the voids therein filled with the thermosetting resin and the outer surface thereof coated fast therewith (hereinafter referred to as "completely impregnated composite material") is obtained.

In the method described above, the composite material having the thermosetting resin therein and deposited thereon can be subjected to aspiration to remove the thermosetting resin from within the voids. As a result of this aspiration, a composite material which has the thermosetting resin deposited on the inner surfaces of the voids in the material and on the outer surface of the material is obtained (hereinafter referred to as "coated composite material"). The amount of the thermosetting resin deposited in this manner can be suitably adjusted by controlling the viscosity of the thermosetting resin (solution) and the intensity of the aspiration. The size of the voids in the coated composite material can be adjusted by selecting the kind of thermoplastic resin, the conditions of production, and the like.

The coated composite material and the completely impregnated composite material of this invention obtained as described above excel in resistance to heat, strength, etc. and promise to find utility in a wide variety of applications because they both have the surfaces of their thermoplastic resin fibers coated with the thermosetting resin.

Since the coated composite material retains minute voids therein, it enjoys the merit of little weight in addition to the properties mentioned above. It, therefore, promises to find utility as a heat insulating material of high strength or as a filter containing minute voids of varying sizes, for example.

In this invention, the ratio between the thermoplastic resin fibers and the reinforcing fibers which are fed to the roller is appropriately selected with consideration to the desired nature of the composite material to be produced. From the practical point of view, this ratio is preferably in the approximate range of 55–70:45–30 by weight. The proportions of these fibers in the composite material produced by this invention are substantially in the same range.

The content of the voids in the foam composite material of the porous structure is determined by the kinds of fibers used and the mixing ratio thereof. Practically, it is properly in the range of 20 to 70% by volume.

The collecting section in which the fibers projected by the roller are collected in the form of a mat is generally a belt which is kept in motion, as in the following working example.

A working example of this invention will now be explained below.

FIG. 1 shows the construction of an apparatus usable for the manufacture of a fiber-reinforced material according to this invention. This apparatus is provided with two fiber separating and throwing rollers adapted to rotate at a high rate and separate incoming fibers 2 and throw them and a feed conveyor adapted to supply the reinforcing fibers and the thermoplastic resin fibers simultaneously to the roller mentioned above.

The two kinds of fibers 2 mentioned above are supplied to an inlet to a first fiber separating and throwing roller 4, guided by a feed roller 3 to the fiber separating and throwing roller 4 and brought into contact with the fiber separating and throwing roller 4 which is kept in rotation at a high speed. The fiber separating and throwing roller 4 comprises a roller and a card clothing embedded in the periphery of the roller. The fibers 2 fed to the fiber separating and throwing roller 4 are cut, separated, and thrown by the action of the high-speed rotation of the roller 4 (roller diameter 20 cm and rotational speed 2,000 to 5,000 rpm). When the cut fibers are subjected simultaneously to the action of an auxiliary propelling blower 6 and the action of aspiration produced by a discharge blower 7, they are deposited on a porous cage roller 5 in the form of a web 8 consisting of a substantially uniform mixture of reinforcing fibers and thermoplastic resin fibers. This cage roller 5 is slowly rotated with a drive device (not shown). The web 8 which is deposited on the cage roller 5 is therefore sequentially fed to a second fiber separating and throwing roller 10.

The second fiber separating and throwing roller 10 has the same structure as the first fiber separating and throwing roller 4 mentioned above. The web 8 of fibers which is fed to the fiber separating and throwing roller 10 is further separated nearly into individual fibers and thrown out into a flight path 11 to effect uniform mixture of the two kinds of fibers. A collecting belt 14 is disposed near the outlet side of the flight path 11. By the action of a blower 13, the separated and thrown fibers are collected on the moving collecting belt 14 as a mat 15 of the shape of a flat plate.

When the throwing path 11 mentioned above is provided on the outlet side thereof with a slit having a width smaller than the length of fibers being fed and the fibers are passed through this slit and then collected on the collecting belt 14, the mat 15 produced is such that the individual fibers collected therein are arranged in the direction of the length of the slit.

The mat may be obtained in a special shape by providing the throwing path 11 on the outlet side thereof with a collecting section which is made of an air passing material such as a wire gauze in the special shape aimed at. In this collecting section, the thrown fibers are collected as a mat of this special shape.

Otherwise the mat 15 can be obtained in a prescribed shape by thermal forming. Since the mat 15 has reinforcing fibers and thermoplastic resin fibers piled as uniformly mixed, it manifests an excellent shape-retaining property, has strong resistance to separation of the reinforcing fibers and the thermoplastic resin fibers, and is easy to handle. By having the fiber collecting section formed in a shape identical with the shape of the mat to be obtained as a finished product, therefore, one-piece mats can be mass-produced in that shape.

Figure 3:
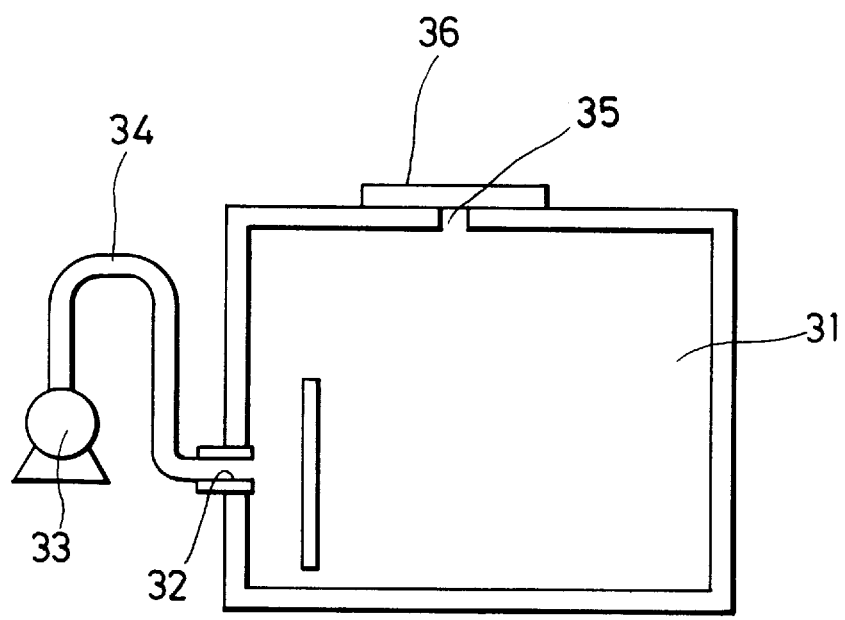
FIG. 3 is a diagram showing one example of the process for producing a coated composite material by subjecting to aspiration a completely impregnated composite material obtained by impregnating a foam material with a thermosetting resin to fill the voids in the foam material.

One example of the method for effecting the aspiration is illustrated in FIG. 3.

In FIG. 3, 31 designates a suction box, 32 a suction inlet, 33 a vacuum pump, and 34 a pipe which is connected to the suction inlet 32. The suction box 31 is provided with a hole 35 through which an object under treatment is exposed to aspiration. A completely impregnated composite material 36 which has been obtained by impregnating a foam material with a thermoplastic resin is placed on the hole 35 as shown in the diagram and the vacuum pump 33 is operated. As a result, a part of the thermosetting resin lodged in the composite material 36 is sucked in the direction of the arrow to effect conversion of this composite material 36 into a coated composite material.

Composite mats were manufactured by the procedure described above with nylon 6 (product of Unitika Ltd., hereinafter referred to as "PA6") fed as thermoplastic resin fibers and carbon fibers (product of Toho Beslon Co., Ltd. marketed as "HTA1200f", hereinafter referred to as "CF") as reinforcing fibers to a fiber separating and throwing device constructed as described above. These composite mats were piled in a suitable number in a metal cavity measuring 1 mm in thickness and 15 mm×15 mm in area and thermally compressed in the metal cavity for about four minutes (heating temperature 240° C. and compressive force 50 kg/cm$^2$) to form a fiber-reinforced material in the shape of a flat plate.

This fiber-reinforced material of the shape of a flat plate was set in place in a metal cavity 5 mm in thickness, heated again therein for about four minutes at a temperature of 240° C. to melt and expand the resin, and then cooled to produce a foam material. The fibers fed to the device were in two kinds using different CF volume ratios of 20% and 30% with due consideration for the repulsive power of the reinforcing fibers. The foam material was impregnated with a thermosetting resin (epoxy resin produced by Dai-Nippon Ink & Chemicals, Inc. and marketed under the trademark "Epicron 830") so as to fill the minute voids in the foam material and to cover the surface of the foam material with the resin. The impregnated foam material was removed of excess thermosetting resin by aspiration to produce a coated composite material. The thermosetting resin mentioned above had 15 g of methylethyl ketone (MEK) and 10 g of triethylene tetramine (curing agent) incorporated therein per 100 g of the resin.

Separately, a completely impregnated composite material having minute voids therein filled with the thermosetting resin was obtained by omitting the aspiration from the procedure described above.

In the procedure described above, the impregnation of the foam material with the thermosetting resin was effected by immersing the foam material for five minutes in the resin solution under a vacuum at room temperature (25° C.). The aspiration was carried out by removing the impregnated foam material from the resin solution and keeping the foam material under a reduced pressure in the approximate range of 30 to 40 mmHg for one to two minutes.

The two kinds of composite materials consequently obtained were cut into ribbons 10 mm in width with a general-purpose saw and used as samples in tests for tensile test and bending test.

Discs 23 mm in diameter were cut from the composite materials and used as samples in a test for thermal conductivity.

<Determination of density>

A foam material and the two composite materials obtained as described above were tested for density with a dry densitometer. The results are shown in Table 1.

TABLE 1

| | Density of sample (g/cm$^3$) | | |
|---|---|---|---|
| | Foam material | Coated composite material | Completely impregnated composite material |
| CF volume ratio 20% | | | |
| Before impregnation | 0.26 | 0.26 | 0.26 |
| After impregnation | | 0.62 | 1.12 |
| CF volume ratio 30% | | | |
| Before impregnation | 0.28 | 0.28 | 0.28 |
| After impregnation | | 0.70 | 1.16 |

A comparison of the densities of the composite materials found before and after impregnation reveals that the density of the coated composite material increased about three times and that of the completely impregnated composite material about five times owing to the impregnation. In the coated composite materials, the amounts of resin deposited on the surface of the fibers were varied to the extent of affecting the physical properties of the composite material by the viscosity of resin and the intensity of aspiration. This fact indicates the necessity for accurately controlling the conditions mentioned above.

<Test for thermal conductivity>

The foam material and the two kinds of composite materials obtained as described above were tested for thermal conductivity and thermal diffusion coefficient. The results are shown in Table 2.

The determination of the thermal conductivity was carried out with a measuring device which has been applied for patent under Japanese Patent Application No. Hei 5(1993)-247612. This device is equipped with a heat source that can be controlled to a fixed temperature and a radiation thermometer. It attains simultaneous measurement of thermal conductivity and thermal diffusion coefficient of a sample plate 23 mm in diameter by keeping the heat source at a fixed temperature in contact with one side of the sample plate, measuring the temperature on the other side of the sample plate with the radiation thermometer at fixed intervals, and analyzing the resultant curve of temperature rise.

TABLE 2

Thermal conductivity and thermal diffusion coefficient of sample

|  | Thickness (mm) | Thermal conductivity, λ (cal/s.cm.K) | Thermal diffusion coefficient, κ(cm$^2$/s) |
| --- | --- | --- | --- |
| CF volume ratio 20% | | | |
| Foam material | 4.5 | 5.12 × 10$^{-5}$ | 5.45 × 10$^{-4}$ |
| Coated composite material | 4.6 | 9.94 × 10$^{-5}$ | 6.84 × 10$^{-4}$ |
| Completely impregnated composite material | 5.0 | 1.28 × 10$^{-4}$ | 7.58 × 10$^{-4}$ |
| CF volume ratio 30% | | | |
| Foam material | 4.6 | 5.76 × 10$^{-5}$ | 5.27 × 10$^{-4}$ |
| Coated composite material | 4.7 | 9.87 × 10$^{-5}$ | 6.25 × 10$^{-4}$ |
| Completely impregnated composite material | 5.1 | 1.77 × 10$^{-4}$ | 7.29 × 10$^{-4}$ |

The completely impregnated composite materials containing no voids showed greater magnitudes of thermal conductivity and thermal diffusion coefficient than the other materials. The coated composite materials showed larger magnitudes than expected. The data imply the adaptability of these composite materials for heat-oriented materials of qualities balanced with dynamic properties through control of the viscosity of resin and the intensity of aspiration.

<Test for tensile strength and bending strength>

Figure 2A:
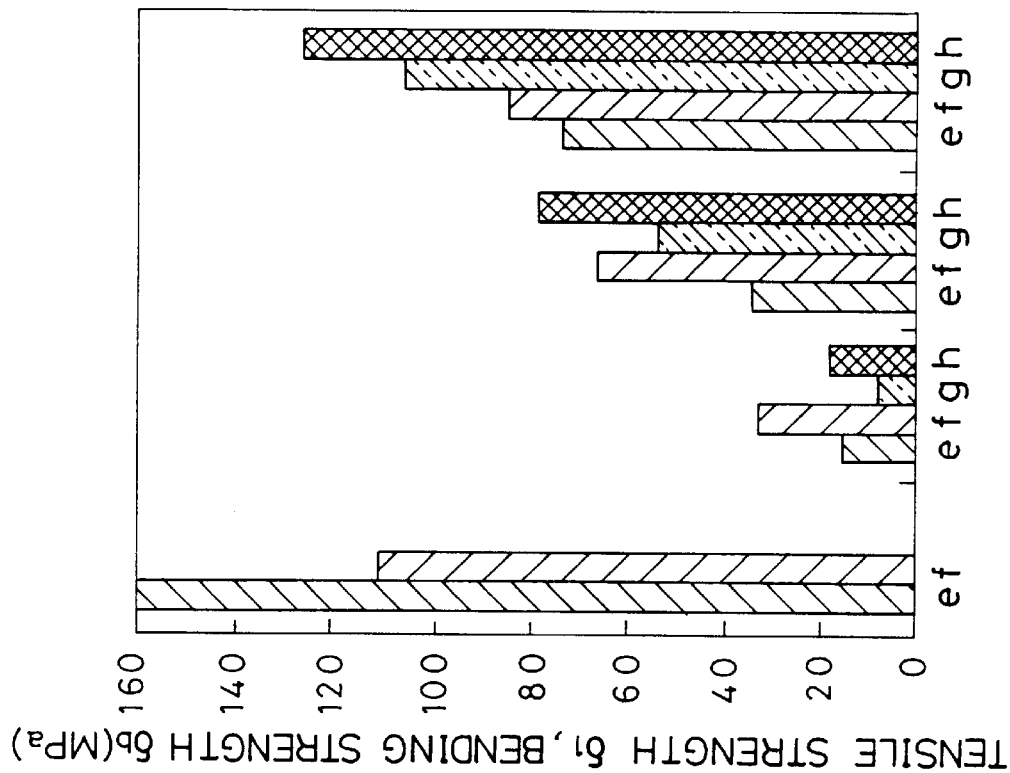
FIGS. 2A and 2B show graphs of the results of a tensile test and bending test conducted on a working example of this invention.
Figure 2B:
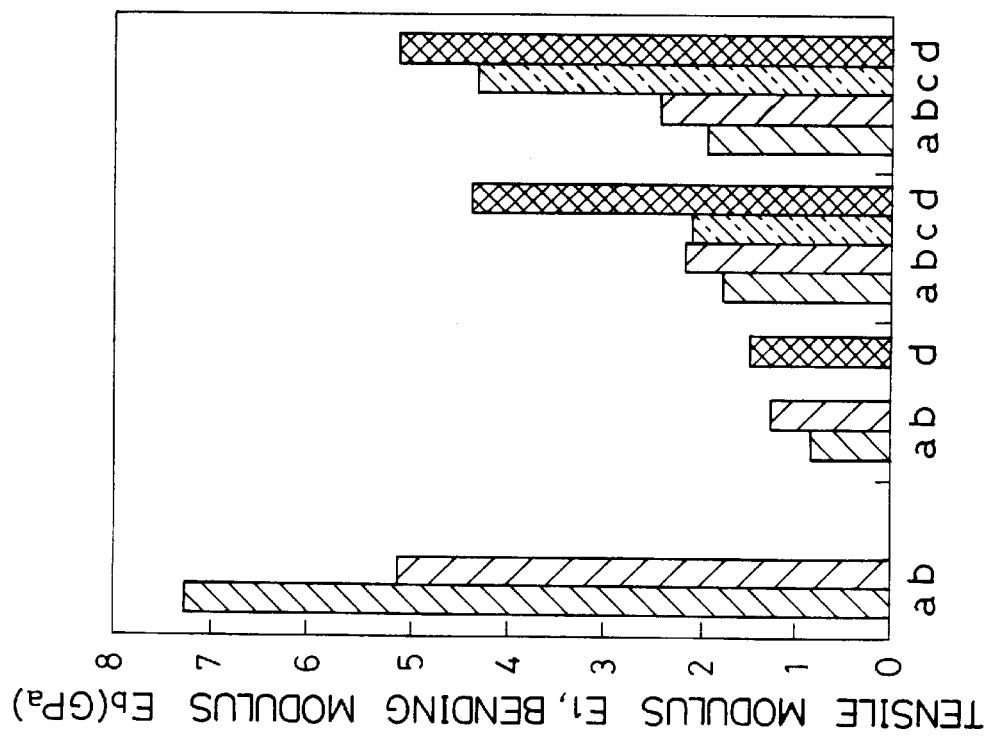

Samples of (A) a composite material obtained by subjecting a composite mat to thermal compression and solidification by cooling, (B) a foam material, (C) a coated composite material, and (D) a completely impregnated composite material were tested for tensile strength and bending strength. The results are shown in FIGS. 2A and 2B.

For the tensile and the bending tests, ribbons 10 mm in width cut from composite materials measuring 15 cm×15 cm in area were used as test pieces. The test pieces cut in a length of 50 mm were used for determining tensile strength and modulus and those prepared in a span of 80 mm were used for determining bending strength and modulus. The determination was carried out by the use of an autograph (produced by Shimadzu Seisakusho Ltd.).

In the diagram, (a) shows the data of tensile modulus $E_1$ and bending modulus $E_b$ (GPa) and (b) the data of tensile strength $\sigma_1$, and bending strength $\sigma_b$ (MPa). Further, a represents the tensile modulus of CF volume ratio of 20%, b the tensile modulus of CF volume ratio of 30%, c the bending modulus of CF volume ratio of 20%, d the bending modulus of CF volume ratio of 30%, e the tensile strength of CF volume ratio of 20%, f the tensile strength of CF volume ratio of 30%, g the bending strength of CF volume ratio of 20%, and h the bending strength of CF volume ratio of 30%.

All the magnitudes increased in the order of foam material, coated composite material, and completely impregnated composite material. This fact indicates that the magnitudes of dynamic properties increased in proportion as the contents of thermosetting resin increased. The data imply the adaptability of the coated composite materials for heat insulating materials possessing strength and for filters containing voids of varying sizes through selection of the kind of thermoplastic resin and control of the viscosity and the intensity of aspiration used during the removal of resin (degree of pressure decrease).

While there have been shown and described present preferred embodiments of the invention, it is to be understood that the invention is not limited thereto but may be otherwise variously embodied and practiced within the scope of the claims set forth below.

What is claimed is:

1. A method for the production of a completely impregnated composite material having the surface thereof coated with a thermosetting resin and essentially consisting of a thermoplastic resin matrix including minute voids filled with a thermosetting resin and reinforcing fibers, which method comprises setting in place a roller and a collecting section disposed in the direction of the rotation of said roller, rotating said roller, feeding thermoplastic resin fibers for the matrix of said composite material and reinforcing fibers for said composite material to said roller, causing said roller to throw a uniform mixture of said two types of fibers onto said collecting section, thereby forming a composite mat of said uniform mixture on said collecting section, then thermally compressing said composite mat and further solidifying said compressed composite mat by cooling and forming a composite material consisting of a plate-shaped thermoplastic resin matrix and reinforcing fibers, further heating said composite material, thereby melting and expanding the thermoplastic resin forming said matrix, then cooling said expanded composite material, thereby forming a foam composite material including minute voids, and subsequently causing said thermosetting resin to form a coating on the surface of said foam composite material and fill said minute voids in said composite material.

2. The method according to claim 1, wherein said collecting section is a belt and said belt is kept in motion.

3. The method according to claim 1, wherein said roller consists of a roller for feeding fibers, a porous cage roller, and a throwing roller.

4. The method according to claim 1, wherein said reinforcing fibers are at least one member selected from the group consisting of glass fibers, carbon fibers and aramid fibers.

5. The method according to claim 1, wherein said thermoplastic resin fibers are at least one member selected from the group consisting of polyamide, polypropylene, polyethylene and polyethylene terephthalate fibers.

6. The method according to claim 1, wherein said step of thermally compressing said composite mat includes heating said composite mat to a temperature in the range of 180° to 300° C. under a pressure in the range of 50 to 100 kg/cm$^2$.

7. The method according to claim 1, wherein said thermosetting resin for the impregnation of said foam composite material is at least one member selected from the group consisting of epoxy resin, unsaturated polyester resin and phenol.

8. The method according to claim 1, wherein the weight ratio of said thermoplastic resin fibers for said matrix and said reinforcing fibers for said composite material to be fed to said roller is in the range of 55–70:45–30.

9. A method for the production of a coated composite material essentially consisting of a thermoplastic resin matrix and reinforcing fibers, said coated composite material having outer surface thereof coated with a thermosetting resin and inner surfaces of void of thermoplastic resin matrix attached with a thermosetting resin, which method comprises setting in place a roller and a collecting section disposed in the direction of the rotation of said roller, rotating said roller, feeding thermoplastic resin fibers for the matrix of said composite material and reinforcing fibers for said composite material to said roller, causing said roller to throw a uniform mixture of said two types of fibers onto said collecting section, thereby forming a composite mat of said uniform mixture on said collecting seciton, then thermally decompressing said composite mat and further solidifying said compressed composite mat by cooling and forming composite material consisting of a plate-shaped thermoplastic matrix and reinforcing fibers, further heating said composite material, thereby melting and expanding the thermoplastic resin forming said matrix, then cooling said expanded composite material, thereby forming a foam composite material including minute voids, subsequently impregnating said foam composite material with a thermosetting resin so that the thermosetting resin is deposited in the voids and on the outer surface of the foamed composite material, and then subsequently removing the thermosetting resin from the void of the foamed composite material by aspiration.

* * * * *

UNITED STATES PATENT AND TRADEMARK OFFICE
CERTIFICATE OF CORRECTION

PATENT NO. : 5,858,152

DATED : January 12, 1999

INVENTOR(S): Yoshihiro NAGATSUKA et al.

It is certified that an error appears in the above-identified patent and that said Letters Patent is hereby corrected as shown below:

On the title page, item [73], the Assignee should be:

— : Agency of Industrial Science & Technology, Ministry of International Trade & Industry, Tokyo, Japan --

Signed and Sealed this

Eighteenth Day of May, 1999

Attest:

Q. TODD DICKINSON

*Attesting Officer*          *Acting Commissioner of Patents and Trademarks*